Figure 1:
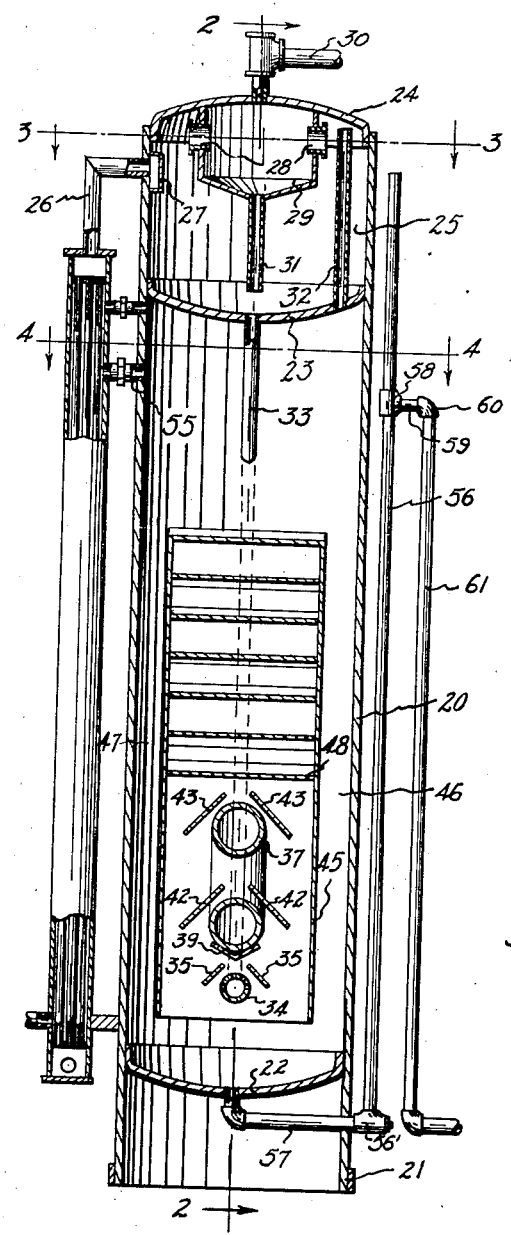

Nov. 28, 1939.   J. P. WALKER   2,181,688
TREATMENT OF OIL, GAS, AND WATER EMULSIONS
Original Filed Sept. 12, 1936   3 Sheets-Sheet 1

Inventor
JAY P. WALKER
By
Attorney

Nov. 28, 1939. J. P. WALKER 2,181,688
TREATMENT OF OIL, GAS, AND WATER EMULSIONS
Original Filed Sept. 12, 1936 3 Sheets-Sheet 2

Inventor
JAY P. WALKER

By
Attorney

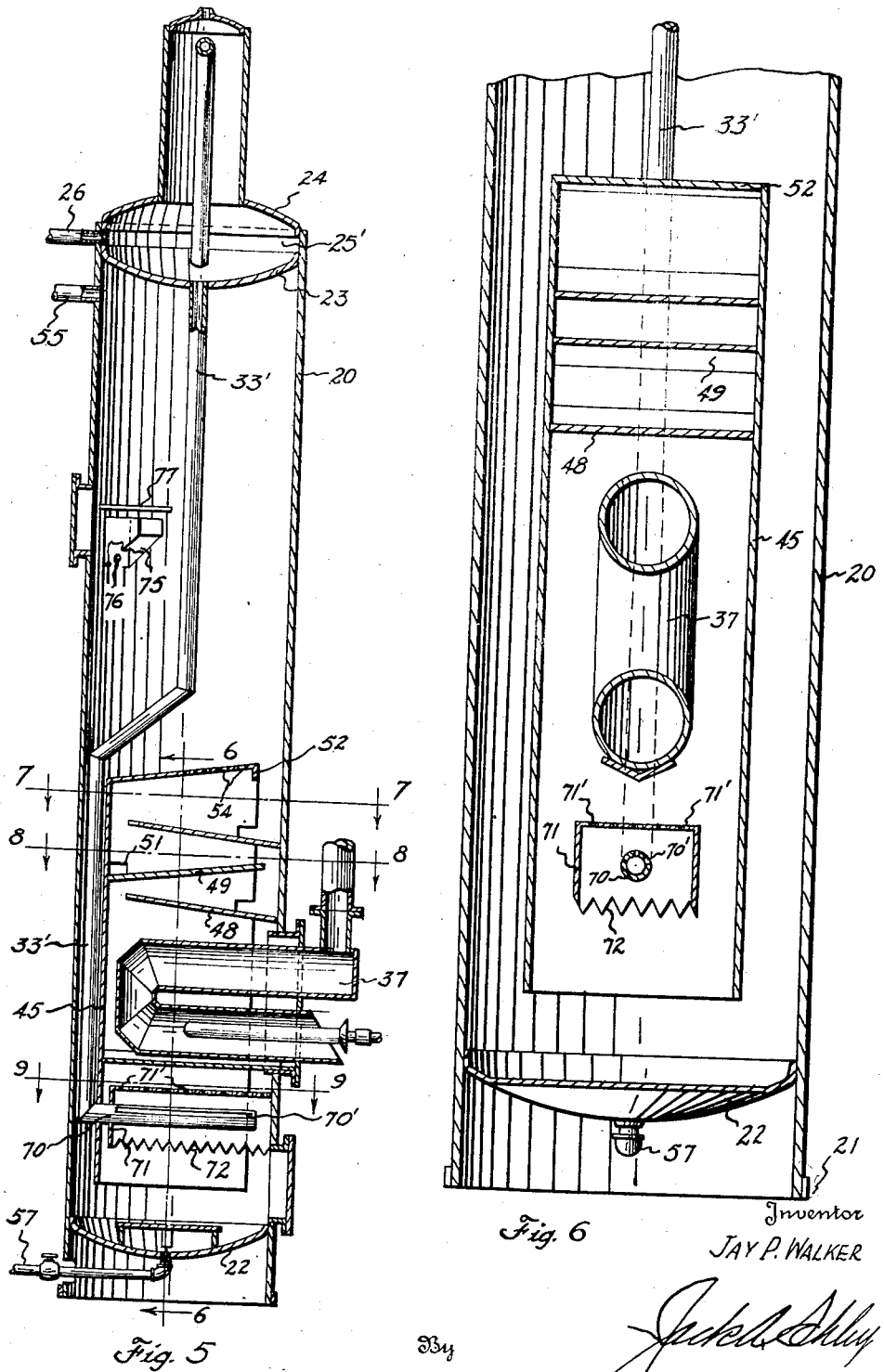

Patented Nov. 28, 1939

2,181,688

UNITED STATES PATENT OFFICE 2,181,688

TREATMENT OF OIL, GAS, AND WATER EMULSIONS

Jay P. Walker, Tulsa, Okla., assignor of forty per cent to Guy O. Marchant and six per cent to Cecil G. Wells, both of Tulsa, Okla.

Continuation of application Serial No. 100,577, September 12, 1936. This application June 21, 1939, Serial No. 280,362

19 Claims. (Cl. 196—5)

This invention relates to new and useful improvements in the treatment of oil, gas and water emulsions.

This application is filed as a continuation in part of my co-pending application, filed March 29, 1935, Serial Number 13,675.

One object of the invention is to provide an improved treating apparatus for handling any grade of emulsion with minimum losses of the valuable gaseous constituents.

An important object of the invention is to provide an improved apparatus for efficiently treating well emulsions which includes means for separating gas from the emulsion, together with means for heating said emulsion whereby a complete separation of the oil, water and gas is carried out.

Another object of the invention is to provide in and around the heating zone means for elongating and prolonging the travel path of the emulsion, together with means for spreading the emulsion and dividing it into numerous small streams, which reduces surface tension of the oil and enhances the precipitation of the water.

A further object of the invention is to provide a thermo-syphon apparatus in an emulsion treating tank, whereby the water is recirculated and reheated. This is particularly advantageous when a well is producing much oil and little water; also, the return flow of the heated water acts to insulate the heating zone against outside cold temperatures. The thermo-syphon apparatus causes the re-circulated hot water to be admixed with the incoming oil and water mixture, thus reducing the degree of heat necessary to treat the emulsion. A further advantage of the thermo-syphon is the breaking up of accumulations of extraneous hydrocarbon solids, whereby more efficient treating is performed.

A still further object of the invention is to provide an improved emulsion treating tank having a heater for heating the emulsion, said heater being bodily removable from the tank, whereby it may be readily inserted in or removed from the tank for any reason.

A construction designed to carry out the invention will be hereinafter described, together with other features of the invention.

Figure 2:
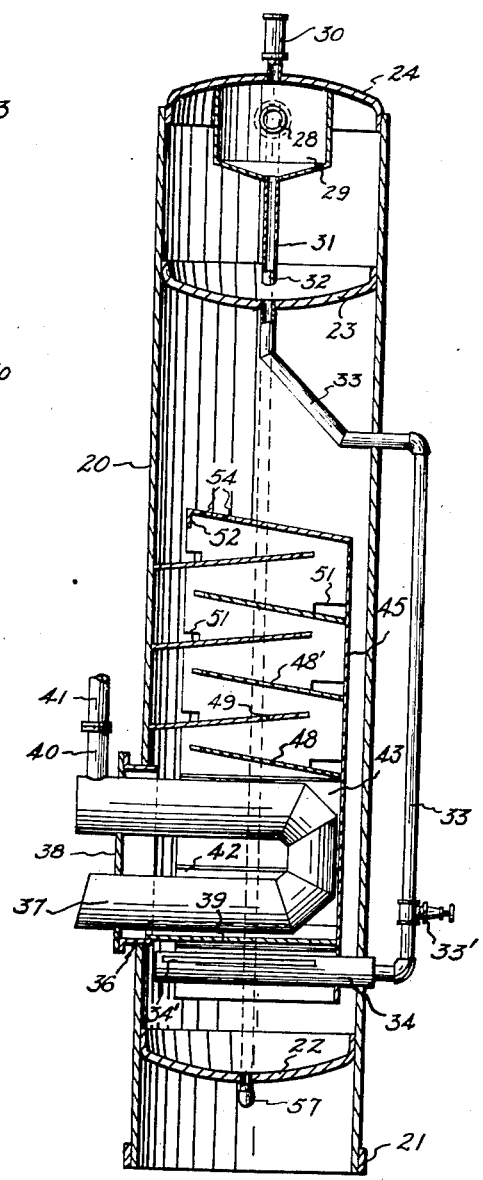
Figure 3:
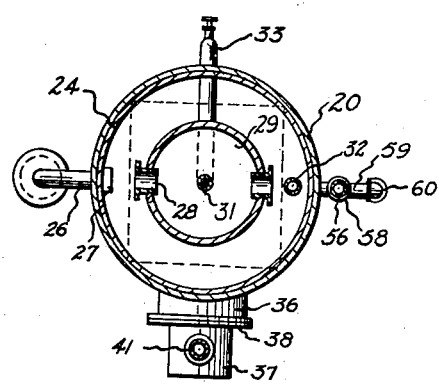
Figure 8:
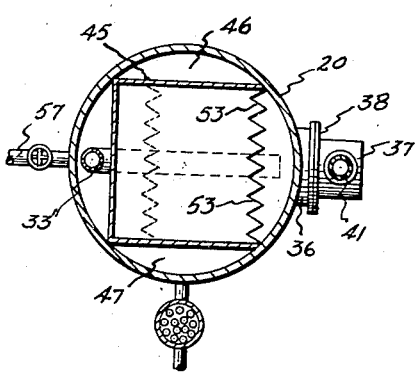
Figure 4:
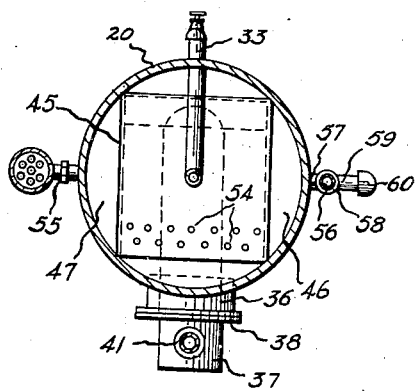
Figure 9:
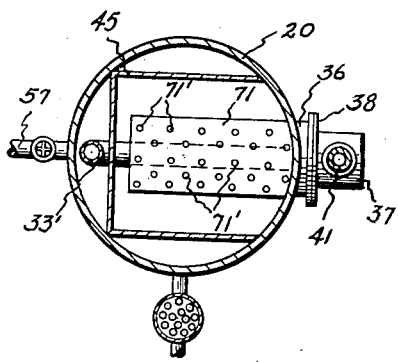
Figure 7:
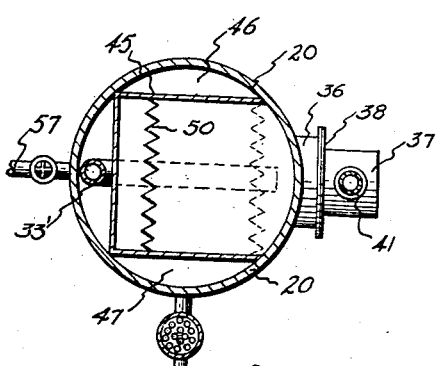

The invention will be more readily understood from a reading of the following specification and by reference to the accompanying drawings, in which an example of the invention is shown, and wherein:

Figure 1 is a view, partly in elevation and partly in section, of an emulsion treating tank constructed in accordance with the invention, Figure 2 is a similar view, taken at right angles to Figure 1, Figure 3 is a horizontal, cross-sectional view, taken on the line 3—3 of Figure 1, Figure 4 is a horizontal, cross-sectional view, taken on the line 4—4 of Figure 1, Figure 5 is a view similar to Figure 1, showing a modified form of the invention, Figure 6 is a transverse, vertical, sectional view, taken on the line 6—6 of Figure 5, Figure 7 is a horizontal, cross-sectional view, taken on the line 7—7 of Figure 5, Figure 8 is a horizontal, cross-sectional view, taken on the line 8—8 of Figure 5, and Figure 9 is a horizontal, cross-sectional view, taken on the line 9—9 of Figure 5.

In the drawings, the numeral 20 designates an upright, cylindrical tank of the usual construction such as is used in the building of separators. The tank is suitably supported upon a base 21 which may rest upon the ground or other support. The tank is provided with a bottom 22, and a dished head 23 is secured in the upper end of the tank a short distance below the top thereof. The upper end of the tank is closed by a crowned top 24, and it will be seen that the members 23 and 24 seal off the upper portion of the tank and form a receiving or separating chamber 25.

An inlet pipe 26 is connected in the upper end of the chamber 25 and discharges into a diverter box 27, whereby the influent is caused to take a circumferential course around the inner wall of the chamber 25. The influent is scrubbed on the wall of the chamber and the liquids pass downwardly into the bottom thereof, while the gaseous fluids which are separated rise in the chamber. These separated gaseous fluids pass through inlets 28 provided in the wall of a gas chamber 29 which is disposed axially within the upper end of the chamber 25. The separated gases enter this chamber and due to the whirling action which is imparted to them as they travel around the wall of the chamber 25, will travel circumferentially around the inner wall of the chamber 29, after which they will rise into an outlet pipe 30 which is connected in the crowned top 24 of the tank. Any liquid condensate of the gaseous fluids within the chamber 29 may pass downwardly through an axial pipe 31 extending from the lower end of the chamber 29, to the bottom of the chamber 25. A vertically extending pipe or tube 32 extends upwardly from the dished head 23 at one side thereof and each end of this pipe or tube is open, whereby a communication is established between the tank 20 below the head 23 and the chamber 25.

The liquids which have been separated from the gas in the chamber 25, but which contain some gas in solution, fall from the chamber 25 down through an axial discharge pipe 33. The pipe 33 extends from the bottom of the head 23 and is offset so as to extend outwardly through the wall of the tank. The pipe then extends downwardly on the outside of the tank to the lower end thereof and is then directed into the tank nearer the lower end thereof. At its lower end, the pipe 33 is connected to one end of a horizontal nozzle 34 which extends diametrically across the tank as is best shown in Figure 2. The nozzle 34 is provided with a plurality of openings 34' and these openings may be located wherever desired. The mixture or emulsion composed of oil and water and substantially free from gas, is discharged from the nozzle 34 beneath a pair of transverse baffles or plates 35 which are located within the tank. As is clearly shown in Figure 1, the baffles are located one on each side of the nozzle 34 and the baffles converge toward their upper end so as to overhang the nozzle. It will be obvious that the mixture which escapes from the nozzle 34 will flow upwardly and strike the baffles 35 escaping upwardly through the space between the upper ends of the said baffles.

It is pointed out that due to the restricted opening or space between the upper ends of the baffles, said baffles act as a spreader and cause the emulsions to flow more or less horizontally or laterally from the nozzle. Because of the degasification in the chamber 25, the emulsion discharged from the nozzle will flow more or less unagitated. The escape of the emulsion from between the restricted space between the baffles breaks up the emulsion and serves to reduce the surface tension of the oil.

The tank 20 is provided with a manhole 36 which is located just above the baffles 35. A U-shaped tubular fire box 37 is mounted in the cover 38 of the manhole so as to extend into and across the tank above the baffles 35, as is best shown in Figure 1. By removing the cover, the fire box may be bodily removed from the tank. This is a valuable feature of the invention for it is obvious that with such arrangement, the fire box may be readily inserted in or removed from the tank at any time for any purpose. The lower leg of the box rests upon an angle bar 39 extending from the manhole to the opposite wall of the tank (Figure 2) and this lower leg receives a suitable burner or heater (not shown). The upper leg of the fire box is closed and carries a nipple 40 extending upwardly from the projecting end, to which a suitable stack 41 may be attached. A suitable damper control may be located in the nipple 40. It is noted that the invention is not to be limited to any kind of heat or heating elements, as any suitable means for heating may be employed.

As is clearly shown in Figure 1, the lower leg of the fire box is located just above the space between the upper ends of the baffles 35, whereby the mixture escaping from the nozzle 34 upwardly between the baffles 35 is directed into contact with the underside of the fire box. Thus, the mixture positively contacts the lower leg of the fire box wherein the heating element is located, and the emulsion passes around this lower leg of the box. After passing around the lower leg of said box the mixture is directed upwardly into contact with the upper leg of the box by a pair of inclined baffles 42, which extend transversely of the tank and which are disposed in a manner similar to the baffles 35, whereby a restricted space is formed between the upper ends thereof. The mixture then passes around the upper leg of the box and contacts another pair of baffles 43, similar to the baffles 42 which cause the mixture to pass upwardly within the tank centrally of said tank.

One of the features of the invention is to set up a thermo-syphon system, whereby the water which has been precipitated out of the oil is to a certain extent recirculated and reheated, as will be hereinafter explained. This system also provides to a degree insulation against outside temperatures. An upright housing 45 is disposed in the lower part of the tank and has its lower end terminating at a point below the nozzle 34, whereby the mixture or emulsions escaping from said nozzle pass into the housing. The housing is closed on three vertical sides and has its bottom open. The vertical edges along the open sides of the housing are attached to the inner wall of the tank 20 as is shown in Figure 4. The fire box 37, nozzle 34, and baffles 35, 42 and 43 are contained within the lower portion of the housing a substantial distance above the open bottom thereof. As is shown in Figure 4, vertical travel spaces or passages 46 and 47 are provided on each side of the housing 45.

It is one of the objects of the invention to reduce the heat necessary to carry out the separating process. By reducing the heat, not only is there a saving in fuel costs but there is a more important saving by preventing excessive losses of the lighter volatile gases, such as gasoline, which pass off under excessive heat and are lost. The upwardly flowing emulsion passing through the zone of the fire box 37 and contacting both the upper and lower legs thereof due to the disposition of the baffles 42 and 43, will finally pass from beneath the uppermost baffles 43 after being properly heated, and will encounter a lower transverse baffle 48. This baffle overhangs the fire box and terminates a short distance from the end wall of the housing. The baffle is inclined slightly upwardly and will permit fluids and liquid to rise within the housing 45. A second inclined baffle 49 extends from the end wall of the housing so as to overhang the baffle 48 and terminate short of the tank wall, as is shown in Figure 1. A third inclined baffle 48' overhangs the baffle 49 and is similar to the baffle 49. A plurality of other baffles, disposed in staggered relation and varying in number according to the height of the housing are provided above these baffles. It is preferable to serrate the edges of the baffles by providing them with saw-teeth 50 as shown in Figure 7, whereby the emulsion is caused to flow in streams and the surface tension of the oil is further reduced. By use of the inclined baffles 48, 49 and those thereabove, certain advantages are had. The emulsion or oil and water mixture which passes up through the housing 39 is virtually washed. The effectiveness of this washing operation is governed, to a large extent, by the length of the path through the water which is travelled by the emulsion. An elongate travel path is highly desirable and the slightly inclined baffles above the fire box within the housing 45, permit an upward flow of the emulsion but at the same time cause it to flow back and forth across the tank, which gives an opportunity for thorough washing and precipitation of the water. The saw-teeth 50 are very important as they assure a spreading of the emulsion and its division into numerous small streams as it travels upwardly. Although the baffles 48, 49 and those thereabove are shown in staggered relation, it is noted that they may be arranged in any manner which will elongate the travel path of the emulsion. The introduction of the emulsion from the nozzle 34 beneath the baffles 35, 42 and 43 assures an upward flow around the fire box 37 which assures proper heating of said emulsion and also causes the mixture to positively contact the lowermost baffle 48.

Apertures 51 are provided in the side walls of the housing 45 just above each baffle and adjacent their lower ends. These apertures permit water which is separated from the emulsion and which runs down the upper side of the baffle, to escape from the housing. Thus, the water is permitted to drain from the upwardly moving fluid. It is highly desirable to take the separated water away from the rising oil as rapidly as possible. The water will be constantly seeking to flow to the bottom of the tank, while the oil will be constantly ascending. The top of the housing 45 is inclined upwardly and is preferably provided with a depending apron 52 having saw-teeth 50 at its lower end. A portion of the top contiguous to the apron may be provided with perforations 54. The oil emulsion will be further separated and divided in streams by passing through the teeth 50 and upwardly through the perforations 54. By the time the fluids reach the oil level zone, substantially all of the water will be separated therefrom. Some of the vapors rising therefrom will condense against the bottom 23 of the chamber 25, and the condensate will drop into the oil, thus enriching the same.

It is pointed out that the water, which accumulates in the bottom of the tank, will have a lower temperature than the liquids passing around and above the fire box 37, and such water will cool as it flows down the passages 46 and 47, consequently a thermo-syphon action will be set up, whereby a circulation of water will be provided upwardly through the housing and downwardly through the passages 46 and 47 and upwardly within the housing 45. This recirculating of the water aids in heating the influent discharged from the nozzle 34 thus requiring less heat to be supplied by the fire box 37. Further, the heated water passing downwardly around the housing and within the tank tends to insulate, by heat exchange, the fluids and liquids being heated within the housing 45, against temperatures outside of the tank which temperatures may be quite low.

After the oil passes from beneath the top of the housing 45 it will rise within the tank 20 and will finally escape through an outlet pipe 55 which is located in the wall of the tank at a point below the dished head 23. It is desirable to space the oil outlet 55 from the bottom of said head whereby a gas space is provided between the oil level of said tank and the bottom of the head. The gas rising from the heated oil will be trapped in this space and will rise in the pipe or tube 32 which extends upwardly from the head 23. This hot gas will flow upwardly into the chamber 25 and will contact the comparatively cool gas which has been separated from the influent within said chamber. This contact with the cool gas will cause the hot gas to drop its liquid condensate back into the influent in the bottom of the chamber 25 and thus, the higher volatiles or liquid content of the gas is remixed with the influent. It is also noted that the gas within the space below the dished head will contact the comparatively cool bottom of said head and this gas, due to the cooling action, will drop its liquid content into the oil which is standing at a level due to the outlet pipe 55 controlling the escape of said oil.

In operation, the water level in the tank 20 is preferably maintained at a point above the housing 45, although it would be possible to carry out the treating operation with the level at a point below the top of said housing. For maintaining the water level in the tank 20, an adjustable stand pipe 56 is employed. This pipe is connected with a T 56' at its lower end, which in turn is connected to the water discharge pipe 57 in such a manner as to swing. The pipe 57 leads from the bottom 22 of the tank. The outer end of the pipe 57 is plugged so that water will rise in the stand pipe 57 to the same level as in the tank 20. A T 58 is connected in the pipe 56 and a short nipple 59 extends from this T and has an elbow 60 screwed onto its end. A discharge pipe 61 leads downwardly from the elbow and is suitably connected with a pit or water conductor or discharge. The water in the pipe 56 will be higher than the water level in the tank 20 due to the additional weight of the oil floating on the water within the tank. It will be seen that by swinging the pipe 56, the nipple 59 will be raised or lowered and thus, the water level in the tank controlled. Of course, any other controlling means might be used.

The operation of the apparatus is simple. The well influent is introduced through the inlet pipe 26 and is directed around the wall of the chamber 25, wherein the major portion of the gas is separated from said influent. The separated gas rises into the axial chamber 29 from which it escapes through the outlet 30 in the top 24 of said tank. The liquids which have been separated in the chamber 25 flow downwardly through the conductor 33 and through the nozzle 34 located in the lower end of the tank 20. It is noted that a feed or control valve 33' may be connected in the conductor 33, whereby the flow through said conductor may be positively controlled and, therefore, the amount of mixture emitting from the nozzle 34 may be controlled. The provision of the valve 33' in the conductor is particularly advantageous in cases where the well is heading or surging, in which case the chamber 25 becomes a receiving chamber wherein the well liquids are stored, and these liquids are fed through the pipe in a continuous flow to the nozzle 34. The flowing conditions of the well in this case are not evident in the flow of mixture from the nozzle 34.

The liquids pass from the nozzle 34 upwardly around the heater or fire box 37 being directed in close proximity to the box by the inclined baffles 35, 42 and 43. The mixture then is carried through an elongate travel path by its contact with the inclined baffles 48, 49 and other baffles within the housing 45. By the time the mixture escapes from the inclined top of the housing 45, all of the water will have been precipitated from the oil and the oil flowing upwardly beyond the housing will escape through the oil outlet pipe 55. The gas rising from the oil will, of course, contact the cool bottom of the head 23 and will drop its liquid content into the oil to build up the gravity thereof. Some of the hot gases above the oil will rise into the chamber 25 through the pipe or tube 32 and will there be cooled so that their liquid content is dropped into the influent standing in the bottom of the chamber 25. The water which is precipitated from the oil will, of course, escape through the stand pipe 56 and outlet pipe 61.

After the process has started, considerably less heat will be required because of the hot oil passing through the elongate path precipitates all the water and the recirculation of this hot water due to the thermo-syphon system within the tank. The preliminary separation whereby the major portion of the gas is separated from the oil and water, makes it more easy to precipitate the water and carry out the separation. It is obvious that the more the influent is heated the greater will be the expansion of the gas and, therefore, the greater the agitation. By keeping down the heat and increasing the travel path through the housing 45, there is less agitation and less expansion, and consequently less loss of gaseous vapors. The water will, of course, gradually settle and pass off through the pipe 56.

In Figures 5 to 9, I have shown a modified form of the invention. In this form, the construction is substantially the same except that in place of the separating chamber 25, a small receiving chamber 25' is formed at the upper end of the tank 20 by locating the dished head 23 nearer to the upper end of the top 24. The well influent is introduced into the chamber 25' through the inlet pipe 26 and the diverter box 27 is eliminated in this form whereby the influent flows directly into the small receiving chamber 25'. In this case there is substantially little or no separation of the gas from the emulsion.

The well influent flows from the chamber 25' downwardly through a conductor 33', which conductor extends axially through the tank 20 to substantially the mid-height thereof, where it is offset so as to extend downwardly within the tank in close proximity to the inner wall thereof. The lower end of the conductor is connected with a transverse nozzle 70 which is similar to the nozzle 34 and which is provided with one or more elongate slots 70'. The mixture or emulsion is discharged from the nozzle 70 into a receiving hood 71 which has a general rectangular shape. This hood extends transversely within the lower ends of the housing 45 and overhangs the nozzle which enters through the end wall of the housing and hood. The hood has a flat top which is preferably provided with perforations 71', while the lower edges of the vertical walls of said hood are provided with saw teeth 72.

It is pointed out that the emulsion which is discharged into the hood from the nozzle will have a tendency to rise but it cannot escape except through the perforations 71' or downwardly and around the saw-teeth edges 72. There are several advantages in this method of introducing the emulsion into the tank. The hood 71 acts as a spreader and causes the emulsion to flow more or less horizontally or laterally from the nozzle. The saw teeth and the perforations break up the emulsion into numerous small streams and the surface tension of the oil is thus reduced.

The housing 45 and the fire box 37 are located within the tank in the same manner as in the first form. It will be obvious that the emulsion passing upwardly through the hood 71 will flow upwardly around the fire box and then travel through an elongate path due to staggered baffles and finally out through the upper end of the housing.

The oil passing from beneath the housing 45 will escape through the oil outlet 55 provided in the upper end of the tank wall. For drawing off deposits and settlings from the bottom of the body of oil which is floating on the water, a catch box 75 is shown mounted on the inner wall of the tank. This box is located at substantially the water level within the tank and has an open top which projects slightly above said water level. It will be obvious that the deposits and settlements at the bottom of the body of oil will enter the catch box 75. A plug 76 is provided in the wall of the tank and this plug may be removed for drawing off the settlings which have collected in said box. Just above the box is a horizontal baffle plate 77 which prevents the oil from channelling when settlings drop into said box. Any other means may be used for this purpose.

From the above, it will be obvious that the second form is very similar to the first form, the only change being in the chamber 25 and also the provision of the hood 71 which replaces the inclined baffles 35, 42 and 43. Also, the conductor 33' is located within the tank instead of exteriorly thereof as is the conductor 33. It is specifically noted that in the latter form the chamber 25' is merely a receiving chamber and is not necessarily provided for the preliminary separation of gas from the well influent. The influent consisting of water oil and gas is conducted down the conductor 33' and is introduced into the heating zone of the fire box. The emulsion or mixture will pass upwardly through the housing 45 where the water will be precipitated. The heating of the mixture will cause the separation of the lighter gaseous fluids from the oil and the water, oil and gas will stand at their given levels within the tank 20. In both cases, the mixture which is introduced into the heating zone is caused to travel through an elongate path due to the series of inclined baffles provided within the housing 45. It is this elongate travel of the mixture which reduces the amount of heat necessary. Also the recirculating of the heated water which is caused by the thermo-syphon system further reduces the heat necessary.

This application is filed as a continuation of my co-pending application, Serial No. 100,577, filed September 12, 1936.

What I claim and desire to secure by Letters Patent is:

1. A separator for oil emulsions including, a tank, an upright housing secured in said tank open at its top and bottom and having its walls contiguous to the wall of the tank to form vertical water circulating passages therebetween, the passages having inlets from the housing at various elevations, a heater in said housing for inducing the water to circulate therethrough, means for discharging a water and oil mixture into said housing, means in the housing for elongating the path of the liquids flowing therethrough, and means in the housing for segregating the liquids flowing through the housing into numerous small streams.

2. A separator for oil emulsions including, a tank, an upright housing secured in said tank open at its top and bottom and having its walls contiguous to the wall of the tank to form vertical water circulating passages therebetween, a heater in said housing for inducing the water to circulate therethrough, means for discharging the water and oil mixture into said housing, and means for draining water from the housing intermediate its ends to promote recirculation thereof.

3. A separator for oil emulsions including, a tank, an upright housing secured in the tank open at its top and bottom and having its walls contiguous to the wall of the tank to form vertical water circulating passages therebetween, a heater extending across the housing from the tank wall, a conductor leading into said housing for discharging a water and oil mixture below said heater, and inclined staggered baffles above the heater and within the housing.

4. A separator for oil emulsions including, a tank, an upright housing secured in the tank open at its top and bottom and having its walls contiguous to the wall of the tank to form vertical water circulating passages therebetween, a heater extending across the housing from the tank wall, a conductor leading into the housing for discharging a water and oil mixture below the heater, means for directing the mixture into the heating zone around the heater, and inclined staggered baffles within the housing above said heater.

5. A separator for oil emulsions including, a tank, an upright housing secured in the tank open at its top and bottom and having its walls contiguous to the wall of the tank to form vertical water circulating passages therebetween, means for maintaining said housing immersed in water in said tank, a heater extending across the housing from the tank wall, a spreader hood in the housing below said heater, a conductor leading into said housing for discharging a water and oil mixture into said hood, and inclined staggered baffles above the heater and within the housing, the spreader hood and the baffles having serrated edges for separating the flowing liquids into numerous small streams.

6. A separator for continuously dehydrating oil well emulsions including, a tank, means for continuously introducing a well emulsion influent into the upper portion of the tank, means for conducting the oil and water mixture to the lower end of the tank, means for maintaining a body of water in said tank into which body the oil and water mixture is discharged, whereby said mixture flows upwardly in said body of water, means for heating said body of water, a conductor in said tank for directing the mixture in an elongated circuitous path, while flowing upwardly through said body of water, means for drawing off at various elevations in said path water washed from said mixture, a segregated channel in said tank for conducting the drawn off water downwardly to the lower portion of the body of water, whereby a thermo-syphonic flow is established to accelerate recirculation of the water in the tank and such recirculated water is caused to flow concurrently with the upwardly flowing oil and water mixture, and means for carrying off the dehydrated oil above the body of water.

7. A separator for continuously dehydrating oil well emulsions including, a tank, means for continuously introducing a well emulsion influent into the upper portion of the tank, means for conducting the oil and water mixture to the lower end of the tank, means for maintaining a body of water in said tank into which body the oil and water mixture is discharged, whereby said mixture flows upwardly in said body of water, means for heating said body of water, a conductor in said tank for directing the mixture in an elongated circuitous path while flowing upwardly through said body of water, means for dividing the upwardly flowing mixture into small streams, means for drawing off at various elevations in said path water washed from said mixture, a segregated channel in said tank for conducting the drawn off water downwardly to the lower portion of the body of water, whereby a thermo-syphonic flow is established to accelerate recirculation of the water in the tank and such recirculated water is caused to flow concurrently with the upwardly flowing oil and water mixture, and means for carrying off the dehydrated oil above the body of water.

8. A separator for continuously dehydrating oil well emulsions including, a tank, means for continuously introducing a well emulsion influent into the upper portion of the tank, means for conducting the oil and water mixture to the lower end of the tank, means for maintaining a body of water in said tank into which body the oil and water mixture is discharged, whereby said mixture flows upwardly in said body of water, a conductor in said tank for directing the mixture in an elongated circuitous path while flowing upwardly through said body of water, a heater in the tank between said conductor and the point of discharge of the oil and water mixture into the body of water, whereby the mixture is heated as it flows upwardly to said conductor, means for drawing off at various elevations in said path water washed from said mixture, a segregated channel in said tank for conducting the drawn off water downwardly to the lower portion of the body of water, whereby a thermo-syphonic flow is established to accelerate recirculation of the water in the tank and such recirculated water is caused to flow concurrently with the upwardly flowing oil and water mixture, and means for carrying off the dehydrated oil above the body of water.

9. A separator for continuously dehydrating oil well emulsions including, a tank, means for maintaining a body of water in the tank, means for continuously introducing an oil well emulsion mixture into the lower portion of the body of water in said tank, whereby said mixture flows upwardly in said body of water, means for heating said body of water, a conductor in said tank for directing the mixture in an elongated circuitous path while flowing upwardly through said body of water, means for drawing off at various elevations in said path water washed from said mixture, a segregated channel for conducting the drawn off water downwardly to the lower portion of the body of water, whereby a thermo-syphonic flow is established to accelerate recirculation of the water in the tank and such recirculated water is caused to flow concurrently with the upwardly flowing oil and water mixture, and means for carrying off the dehydrated oil above the body of water.

10. A separator for continuously dehydrating oil well emulsions including, a tank, means for maintaining a body of water in the tank, means for continuously introducing an oil well emulsion mixture into the lower portion of the body of water in said tank, whereby said mixture flows upwardly in said body of water, means for heating said body of water, a conductor in said tank for directing the mixture in an elongated circuitous path while flowing upwardly through said body of water, means for drawing off at various elevations in said path water washed from said mixture, means for dividing the upwardly flowing mixture into small streams, a segregated channel for conducting the drawn off water downwardly to the lower portion of the body of water, whereby a thermo-syphonic flow is established to accelerate recirculation of the water in the tank and such recirculated water is caused to flow concurrently with the upwardly flowing oil and water mixture, and means for carrying off the dehydrated oil above the body of water.

11. A separator for continuously dehydrating oil well emulsions including, a tank, means for maintaining a body of water in the tank, means for continuously introducing an oil well emulsion mixture into the lower portion of the body of water in said tank, whereby said mixture flows upwardly in said body of water, a conductor in said tank for directing the mixture in an elongated circuitous path while flowing upwardly through said body of water, a heater in the tank between said conductor and the point of discharge of the oil and water mixture into the body of water, whereby the mixture is heated as it flows upwardly to said conductor, means for drawing off at various elevations in said path water washed from said mixture, a segregated channel in said tank for conducting the drawn off water downwardly to the lower portion of the body of water, whereby a thermo-syphonic flow is established to accelerate recirculation of the water in the tank and such recirculated water is caused to flow concurrently with the upwardly flowing oil and water mixture, and means for carrying off the dehydrated oil above the body of water.

12. A separator for oil well emulsion mixture including in combination, a tank, means for maintaining a body of water of substantial height in said tank, an oil outlet above said means for maintaining a body of dehydrated oil floating upon said body of heated water, a conductor for delivering a well emulsion mixture to the lower portion of the body of water, whereby said mixture flows upwardly through said body of water to the body of oil, and means in said tank immersed in said body of water for directing the flow of the mixture therethrough and for washing the entrained water from the influent mixture, said means having provision for extracting and draining water from the mixture at various elevations in said body of water and conducting it in a segregated path to the bottom of the body of heated water free from contamination with the flowing mixture whereby the extracted water is recirculated through the body of water and its flow accelerated for conserving heat and promoting dehydration of the mixture.

13. A separator for oil well emulsion mixture including in combination, a tank, means for maintaining a body of water of substantial height in said tank, an oil outlet above said means for maintaining a body of dehydrated oil floating upon said body of heated water, a conductor for delivering a well emulsion mixture to the lower portion of the body of water, whereby said mixture flows upwardly through said body of water to the body of oil, means in said tank immersed in said body of water for directing the flow of the mixture therethrough and for washing the entrained water from the influent mixture, said means having provision for extracting and draining water from the mixture at various elevations in said body of water and conducting it in a segregated path to the bottom of the body of heated water free from contamination with the flowing mixture whereby the extracted water is recirculated through the body of water and its flow accelerated for conserving heat and promoting dehydration of the mixture, and means for spreading and dividing the influent mixture into numerous small streams above the point of entry of the extracted water into the body of water.

14. A separator for oil well emulsions including in combination, an upright tank, means for introducing a well influent into the tank, means for maintaining a body of water in said tank including a water discharge, means for maintaining a body of dehydrated oil upon the body of water including an oil discharge, a conductor extending from the tank above the oil level to the lower portion of the tank and discharging thereinto for conveying the oil and water mixture to the lower portion of the body of water, a thermo-syphon housing mounted uprightly in said body of water in said tank and defining a segregated channel between it and the wall of the tank communicating with the body of water at its lower end, inclined baffles in said housing in the path of the upwardly flowing mixture, said housing having outlets to said channel at said inclined baffles to drain extracted water, and means for heating said body of water.

15. A separator for oil well emulsions including in combination, an upright tank, means for introducing a well influent into the tank, means for maintaining a body of water in said tank including a water discharge, means for maintaining a body of dehydrated oil upon the body of water including an oil discharge, a conductor extending from the tank above the oil level to the lower portion of the tank and discharging thereinto for conveying the oil and water mixture to the lower portion of the body of water, a nozzle extending from said conductor into said body of water, baffles above said nozzle for deflecting the mixture discharge from said nozzle, a thermo-syphon housing mounted uprightly in said body of water in said tank and overhanging said nozzle and baffles, and defining a segregated channel between it and the wall of the tank communicating with the body of water at its lower end, inclined baffles in said housing in the path of the upwardly flowing mixture, said housing having outlets to said channel at said inclined baffles to drain extracted water, and means located between the nozzle and the inclined baffles for heating said body of water.

16. A separator for oil well emulsions including in combination, an upright tank, means for introducing a well influent into the tank, means for maintaining a body of water in said tank including a water discharge, means for maintaining a body of dehydrated oil upon the body of water including an oil discharge, a conductor extending from the tank above the oil level to the lower portion of the tank and discharging thereinto for conveying the oil and water mixture to the lower portion of the body of water, a thermo-syphon housing mounted uprightly in said body of water in said tank and defining a segregated channel between it and the wall of the tank communicating with the body of water at its lower end, inclined baffles in said housing in the path of the upwardly flowing mixture, said housing having outlets to said channel at said inclined baffles to drain extracted water, and means for heating said body of water, the conductor being located exteriorly of the housing and arranged so that the water from the body of water will not back flow thereinto.

17. A separator for oil well emulsions including, a tank, a conductor for an oil and water well mixture extending into the lower portion of said tank, means for maintaining a body of water in said tank into which body of water the oil and water mixture is discharged, whereby said mixture flows upwardly through said body of water, means for heating said body of water, an oil discharge for maintaining a body of washed oil floating upon said body of water, a plurality of inclined elements mounted one above the other in said tank and extending transversely thereof in said body of water arranged to cause the upwardly flowing oil and water mixture to pursue a circuitous path through said body of water, and a conductor connected with the lower portions of said inclined elements for drawing off water therefrom at various elevations in said tank.

18. A separator for oil well emulsions including, a tank, a conductor for an oil and water well mixture extending into the lower portion of said tank, means for maintaining a body of water in said tank into which body of water the oil and water mixture is discharged, whereby said mixture flows upwardly through said body of water, means for heating said body of water, an oil discharge for maintaining a body of washed oil floating upon said body of water, a plurality of inclined elements mounted one above the other in said tank and extending transversely thereof in said body of water arranged to cause the upwardly flowing oil and water mixture to pursue a circuitous path through the body of water, and a conductor connected with the lower portions of said inclined elements for drawing off water therefrom at various elevations in said tank, said last named conductor having communication with the lower end of the tank, whereby a thermo-syphonic flow is established to accelerate recirculation of the water in the tank and such recirculated water is caused to flow concurrently with the upwardly flowing oil and water mixture.

19. A separator for continuously dehydrating oil well emulsions including, a tank, means for maintaining a body of water in the tank, means for continuously introducing an oil well emulsion mixture into the lower portion of the body of water in said tank, whereby said mixture flows upwardly in said body of water, means for heating said body of water, means for conducting the mixture upwardly through said body of water, means for drawing off at various elevations in said path water washed from said mixture, a segregated channel for conducting the drawn off water downwardly to the lower portion of the body of water, whereby a thermo-syphonic flow is established to accelerate recirculation of the water in the tank and such recirculated water is caused to flow concurrently with the upwardly flowing oil and water mixture, and means for carrying off the dehydrated oil above the body of water.

JAY P. WALKER.